United States Patent Office 3,425,370
Patented Feb. 4, 1969

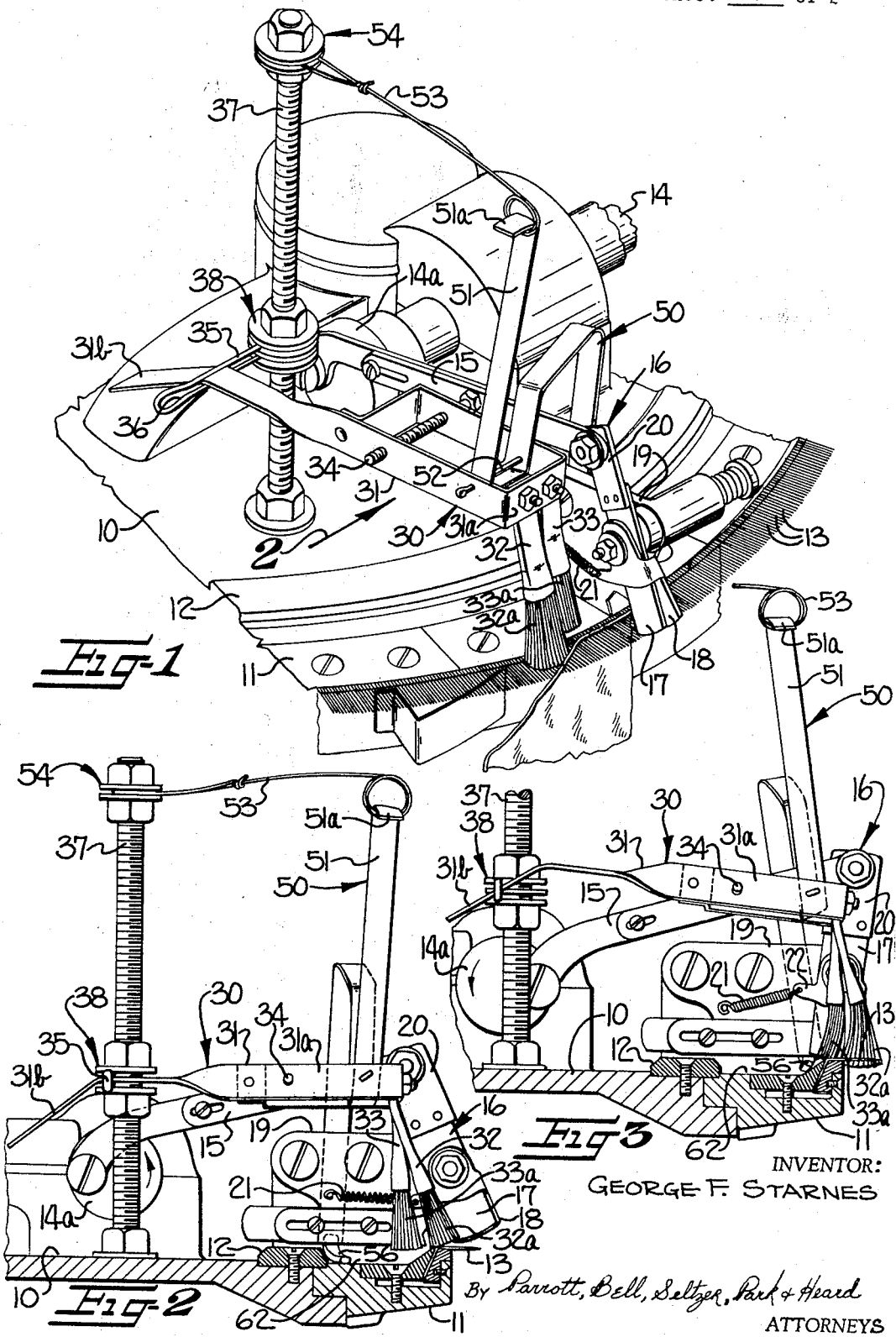

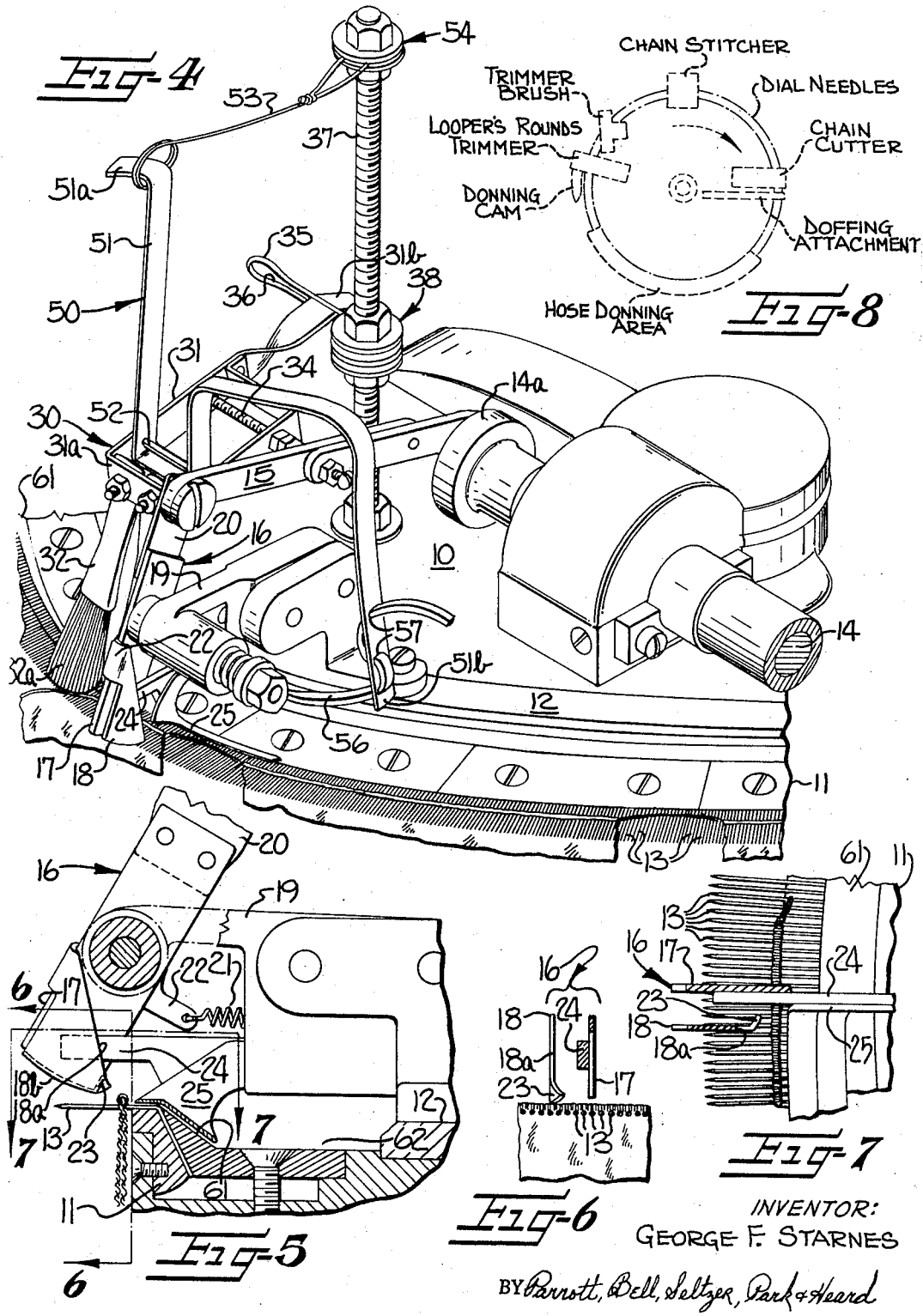

3,425,370
CUTTING AND DOFFING MEANS FOR
HOSIERY LOOPERS
George F. Starnes, Taylorsville, N.C., assignor of fifty
percent each to Glenn A. Starnes, and Wynn E. Starnes,
Hickory, N.C.
Filed Oct. 20, 1966, Ser. No. 588,164
U.S. Cl. 112—25  10 Claims
Int. Cl. D05b 7/00, 65/02, 71/02

This invention relates to looper machines of the type used for looping the toes of circularly knit or seamless hosiery, and more particularly to a novel cutting and doffing assembly for severing the seaming thread employed in seaming or looping together the two fabric sections of the toe of the hose and for automatically removing successive hose off the dial needles or points immediately thereafter.

The usual type of a looper includes a constantly rotating dial provided with radially projecting, closely spaced dial points onto which an operator impales the looper line course of a plurality of hose. Each hose is successively moved past a looper's rounds trimmer, under a trimmer brush which wipes the residual yarn away from the looper line course and then past a sewing mechanism or chain stitcher where the two halves of the toe pocket are stitched together along the edges with a seaming thread. Thereafter, each hose moves past a seaming thread cutting device or chain clipper for severing the thread chain formed between adjacent hose by the thread employed in stitching the two halves of the looper line course together. The hose is then doffed from the dial points by the operator or by a doffing attachment positioned subsequent to the chain clipper. A serrated blade type doffing attachment used in looping machines is disclosed in my earlier U.S. Patent 2,749,857, and such disclosure is intended to be incorporated herein by reference thereto.

The chain cutter includes a movable cutting blade mounted to reciprocate above and radially of the dial points and the blade moves in an arcuate path about an axis substantially parallel to the path of travel of the dial points. Upon each active or inward stroke of the blade, it moves closely adjacent the upper surfaces of the points and contacts the thread chain formed between adjacent hose impaled on the dial points. Mounted on the looper machine radially inside the dial points in the path of reciprocation of the cutting blade is a stationary cutter blade which cooperates with the moving cutting blade to sever the thread chain.

To prevent the blade from cutting the looper line of the hose as the hose passes under the path of the reciprocation of the blade, the cutting device is spaced slightly from the top of the hose and provided with a pair of kicker elements spaced closely adjacent opposite sides of the movable blade. The kicker elements are operatively connected to the movable cutting blade for reciprocation therewith and extend slightly below the lower end of the blade. Hooks extend inwardly from the inner edge of each kicker element and, during inward movement of the kicker elements, they engage the thread chain between adjacent hose and position it on the cutting blade for severance upon coaction of the two blades.

When a portion of a hose passes under the reciprocating cutting device, the hooks on the kicker elements contact the top edge of the hose and their inward movement is stopped thereby. The slightly raised cutting blade continues its inward stroke, passing slightly above the top edge of the hose and, upon its return stroke, the rear edge of the blade engages a portion of the kicker elements to withdraw the hooks from the upper edge of the hose prior to the next active stroke of the cutting device.

Between adjacent hose on the dial ring, the thread chain is not held by the edge loops of the corresponding hose and rises above the dial points so that the hooks of the kicker elements, which then are not stopped by the top of the hose, catch the seaming thread and it rides inward on the kicker elements to be cut by the cooperating blades.

Such cutting devices have disadvantages, particularly when seaming or looping fine denier hose such as ladies' nylon stockings on the looper machine. When the hooks of the kicker elements engage the upper rounds of such fine denier hose during reciprocation they often break or tear the thin thread filaments of the hose. Additionally, because of the light weight and elasticity of the hose, the hooks sometimes draw the hose sufficiently above the dial points during movement of the kicker elements so that the cutting blades inadvertently cut threads in the hose tops. Such action by the cutting device produces inferior quality hosiery having tears, snags, and cut threads along the looper line course of the toe portion.

A doffing attachment is located subsequent to the cutting device to remove the hose from the dial points and includes an arm mounted for reciprocation and having a serrated blade attached to its end. The serrated blade contacts the top portion of the hose in its outward active stroke and pushes the hose off the dial points. Such serrated doffing blades are effective in removing hose of comparatively heavy denier such as socks and the like; however, when fine denier hose are doffed by the blade, the serrations quite often snag the threads and the hose are damaged during removal. It is also quite difficult to maintain the reciprocating blade close enough to the rotating dial points to effectively contact the light denier hose for removal.

It is therefore an object of the present invention to provide a novel thread chain cutter and hose doffing mechanism which overcome, to a great extent, the disadvantages found in the prior art.

It is another object of this invention to provide a thread chain cutter for severing the trailing end of a seaming thread employed in stitching two halves of a hose together which effectively cuts the thread chain without consequently damaging the hose.

It is a further object of this invention to provide a doffing attachment for effectively removing fine denier hose from looper machines without damaging the hose during removal.

It is an additional object of this invention to provide a novel lubricating attachment for a looper machine which cooperates with the doffing attachment to lubricate the dial points during doffing of hose therefrom.

Some of the objects of the invention having been stated, other objects will appear as the description proceeds when taken in connection with the accompanying drawings, in which:

FIGURE 1 is a broken-away, perspective view of a looper machine showing the rotatable dial points thereon and incorporating the novel chain cutter and doffing mechanism and lubricating attachment of the present invention;

FIGURE 2 is a side view, partially in section and looking in the direction of arrow 2 in FIGURE 1, showing the cutter and doffing mechanism positioned at its radially innermost position;

FIGURE 3 is a side view of the cutting and doffing device as seen in FIGURE 2, but showing the cutter and doffing mechanism at its outermost position;

FIGURE 4 is a broken-away, perspective view of the looper machine of FIGURE 1 looking at the opposite side of the cutter and doffing mechanism from that shown in FIGURE 1, and showing the lubricating attachment;

FIGURE 5 is a sectional view showing the cutting means and kicker element of FIGURE 4 in detail;

FIGURE 6 is a broken-away, vertical sectional view taken substantially along line 6—6 of FIGURE 5;

FIGURE 7 is a broken-away, sectional plan view taken substantially along line 7—7 of FIGURE 5; and FIGURE 8 is a schematic plan view of a looper machine, with various elements of the machine shown in broken lines in their respective positions along the circular rotary dial of the machine.

Referring more specifically to the drawings, numeral 10 indicates a stationary disc of a conventional looper machine which is carried by a conventional frame (not shown). A dial ring 11 is mounted for rotation on the stationary disc 10 and retained thereon by an annular clamping ring 12. The rotary dial ring 11 is provided with a circular series of radially projecting dial loop points or needles 13. The dial points 13 are adapted to support a plurality of hose impaled thereon for seaming their toe portions and advancing them past conventional serially arranged operating instrumentalities of the looper, most of which are shown diagramatically in FIGURE 8.

Referring briefly to FIGURE 8, in a conventional looper machine, a plurality of hose are impaled on the dial points of the machine by an operator in a hose donning area. Each hose has a circular looper line course in its toe portion which is formed into two halves to be united. Complementary stitches from opposite halves of the looper line course are impaled on each dial point by the operator and the hose, in side-by-side but spaced relationship, travel in the direction indicated on the rotating dial points. The top portions of each hose are conventionally trimmed of excess material by a looper's rounds trimmer and the trimmed material removed therefrom by a trimmer brush, after which the two halves of each hose are sewn or looped together along their looper line course by a chain stitcher. After leaving the chain stitcher, the hose is carried by the dial points through a chain cutter doffing attachment where the chain thread of each hose is severed at its trailing edge and each hose is doffed from the dial points.

Referring again to FIGURE 1, the looper has conventional means, not shown, for continuously driving a drive shaft 14 which overlies the disc 10. Secured to the end of shaft 14 for rotation therewith is a disc 14a having an eccentrically mounted crank arm 15 pivotally secured thereto. Operatively attached to crank arm 15 is a cutter and doffing mechanism of the present invention generally indicated at 16. As can be seen, the crank arm 15 is radially adjustable with respect to shaft 14 and rotation of drive shaft 14 produces a reciprocatory motion in crank arm 15 which supplies power to operate the cutter and doffing mechanism 16.

*The cutting attachment*

The cutter and doffing mechanism 16 is composed of a thread cutting means or attachment having a movable cutting blade 17 and a cooperating kicker element 18 spaced precedent to the cutting blade with respect to the direction of rotation of the dial points. Cutting blade 17 and kicker element 18 are pivotally mounted on a duplex bracket 19 suitably secured to the stationary disc 10 and which overlies the path of travel of the dial points 13. An extension arm 20 is fixed to the upper end of cutting blade 17 and connects the blade to the reciprocable crank arm 15.

Kicker element 18 is mounted on bracket 19 for free pivotal movement and is urged radially inwardly with respect to the dial points by a spring 21, one end of which is attached to an extension 22 of kicker element 18 which extends around the outer edge of blade 17, and the other end of which is suitably secured to an inner portion of bracket 19. Extension 22 abuts the outer edge of blade 17 and, thus, kicker element 18 is restrained in its radially inward movement thereby. As seen in FIGURE 5, kicker element 18 extends downwardly so that its lower portion is disposed below the lower portion of the cutting blade 17.

An important feature of this invention resides in an improved hook 23, located on the radially inward edge 18a of kicker element 18 and adjacent its arcuate bottom edge 18b in such a manner as to prevent the same from accidentally engaging and tearing the portions of the seam or chain stitching being held on the dial points, but which is effective to transfer the chain extending between adjacent hose to the cutting means. As can be seen in FIGURES 6 and 7, hook 23 is formed from an extension of edge 18a which is bent sideways from the kicker element toward the cutting blade 17. Located radially inwardly from and in the path of cutting blade 17 is a stationary blade 24 mounted on bracket 19. A ramp element 25 is mounted on bracket 19 contiguous with stationary blade 24 and extends radially outwardly therefrom.

In operation, the cutting blade 17 is continuously reciprocated by crank arm 15 and passes closely adjacent the upper surfaces of dial points 13. As a seamed hose passes under the reciprocating cutting blade 17 and kicker element 18, the sewing thread forming the seam is held close to the upper surfaces of dial points 13 by the top of the hose to which it is attached. During the active stroke of blade 17, kicker element 18 rides inwardly therewith, passes over the top of the hose, and presses the seamed top portion of the hose down on the points 13 to prevent its contact with the blade 17.

The bent hook 23 of kicker element 18 is displaced from and lies above the plane of arcuate bottom edge 18b of kicker element 18 so that the hook 23 does not engage the top portion of the hose extending above the dial points 13. Depending on the denier and thickness of the hose being sewn, however, bottom edge 18b of kicker element 18 may frictionally engage the top portion of the hose at some point on the inward active stroke of kicker element 18 and cutting blade 17 to stop the inward travel of the kicker element. As can be seen in FIGURE 5 the arcuate bottom edge 18b is not generated about a single axis throughout its length, but instead, the radially inward portion of the edge 18b is of a smaller radius than the remainder of edge 18b so that the lower edge 18b gradually moves closer to the dial points 13 as the kicker element 18 moves inwardly during each active stroke.

As the moving dial points 13 advance the hose from under the cutting device, the chain extending from the trailing edge of the corresponding hose to the next succeeding hose rises above the dial points due to its not being held down by the top edge of the hose. As the movable cutting blade and kicker element move inwardly, hook 23 will then engage the raised thread chain and draw it in front of cutting blade 17. Further inward movement of the cutting blade 17 brings the thread chain into engagement with the ramp element 25 and the chain rides therealong to contact stationary blade 24 where it is severed by the coaction of blades 17 and 24.

Thus, it can be seen that the kicker element 18 is designed so that hook 23 and radially inward edge 18a do not contact the top of the hose and the lower edge 18b may press the hose down and prevent its contact by the cutting blade 17; however, when the hose advances from beneath the cutting device 16, hook 23 readily engages the thread chain to position it on the cutting blade 17.

Although the novel configuration of the hook and kicker element described are particularly effective when fine denier hosiery is sewn on the looper machine, the cutting device of the present invention can be used readily for cutting looper thread chain of heavy denier hosiery. In fact, because the bottom edge 18b of kicker element 18 passes over the top of the hose and impresses it on the dial points, heavy denier hose is quite effectively isolated from contact with the cutting blade with consequent damage to the hose product.

Doffing attachment

The improved doffing attachment, broadly designated at numeral 30, comprises an elongate arm 31, preferably made of thin, rigid material, such as sheet metal or the like, which extends radially outwardly above disc 10 and is bent at its outer end portion to form a substantially horizontally disposed rectangle 31a. The outer end of rectangular portion 31a has doffing brush means attached thereto which is shown as a pair of brushes 32, 33 disposed above the dial points 13 and having bristle portions 32a, 33a extending downwardly into close proximity to the top of the dial points. Elongate arm 31 is pivotally attached to crank arm 15 by means of a bolt 34 so that reciprocation of crank arm 15 produces similar movement in elongate arm 31. Elongate arm 31 is bent or twisted about its longitudinal axis adjacent its inner end to dispose the thick or wide dimension of the sheet metal arm 31 substantially horizontally and this portion of the arm extends through and is guidably supported by a substantially horizontal guide element 35 having a receiving slot 36 slidably penetrated by arm 31. Guide element 35 is supported by an upstanding, threaded rod 37 and is vertically adjustable thereon by means of bolts and washers, generally indicated at 38.

As seen in FIGURE 2, reciprocation of crank arm 15 effects similar reciprocation to elongate arm 31 and brushes 32, 33 attached thereto. The horizontally flat inner portion of arm 31 is bent downwardly midway of its length to provide a cam surface or portion 31b which cooperates with guide element 35 to cause contact of brush bristle portions 32a, 33a with the dial points to disengage the hose, as will be explained. As can be seen in FIGURES 2 and 3, radially outward movement of arm 31 causes portion 31b of the arm to slide in slot 36 and, because of the downward bend in the portion, the forward part of arm 31 pivots downwardly about bolt 34. Downward movement of the forward part of arm 31 forces bristle portions 32a, 33a to move downwardly between adjacent dial points during their outward stroke along dial points 13 (FIGURE 3).

As seen in FIGURE 2, when arm 31 is at its innermost point of travel, bristle parts 32a, 33a are withdrawn from between dial points 13 and are positioned radially inwardly above them. Brush 33 is located precedent to brush 32 with respect to the direction of rotation of dial points 13 and its bristles 33a are located inwardly of the dial points with respect to the bristles 32a of brush 32 so that bristle portions 33a may contact the inner portions of dial points 13.

In FIGURE 2, it can be seen that the relative location of brushes 32 and 33 causes bristles 33a, during the outward or active stroke of the brushes, to initially contact the top of hose impaled on dial points 13 and move a portion of the hose radially outwardly on the points. On subsequent outward strokes, bristles 32a contact that portion of the hose and move it off the points 13. By providing brushes which can be directed downwardly between the dial points on the active or doffing stroke, hose can be positively removed from the dial points, irrespective of their denier, without tearing or damaging the parts of the hose being contacted by the doffer.

Brush 33 and its bristles 33a are also located radially inwardly on the dial ring to aid in lubricating the dial points, as will be explained.

Lubricating attachment

In the usual operation of a looper machine the rotating dial points of the machine show a tendency to rust due to the moisture placed thereon by the hands of the operator when donning the hose. Additionally the dial points tend to wear on their grooved top portions (not shown) due to contact with the needle of the sewing mechanism during looping of the hose. It is therefore highly desirable to provide means for lubricating the dial points during operation of the looper machine. To accomplish this end the novel attachment of the present invention was devised.

The novel lubricating attachment of the present invention is broadly designated at numeral 50 and can be best seen in FIGURES 2 and 4 of the drawings. The attachment 50 is composed of an appropriately bent lever 51 which is pivotally mounted, as at 52, on and within the horizontal, rectangular portion 31a of elongate arm 31. An upwardly extending reach of the lever 51 has a projecting end portion 51a thereon to which one end of a restraining member or wire 53 is pivotally connected, which wire acts as a motion amplifying means for the attachment, as will be further explained. The other end of wire 53 is secured to the upstanding rod 37, as by nuts and washers indicated generally at 54. The wire 53 is firmly secured against rotation about the bolt 37 and may be biased in a direction which maintains it in engagement with the end 51a of lever 51 during operation of the lubricating attachment. The lever 51 has an inverted U-shaped bend which extends over crank arm 15, and a downwardly extending reach thereof has an end 51b terminating closely above the dial ring 12.

As can best be seen in FIGURE 5, dial ring 12 has an upwardly sloping wall 61, which forms, with clamping ring 12, an annular troughway 62 located below and radially inwardly of points 13 on the looper machine, which troughway is conventional. During operation and maintenance of the looper machine, lubricating liquids are periodically applied to various parts of the machine. Troughway 62 acts as a reservoir for excess lubricant and normally contains an accumulation or film of such lubricant on the bottom surface of the troughway.

To aid in transferring this lubricant to the dial points 13, an elongate pliable element such as a leather thong 56 is removably attached to the end 51b of lever 51. One end of thong 56 extends through a plurality of holes 57 in end 51b to secure it thereto and the free end portion of thong 56 normally contacts and rests on the bottom surface of troughway 62.

In operation, reciprocable movement of crank arm 15 is transmitted via elongate arm 31 to lever 51. Wire 53 fixes the position of the upper end 51a and causes lever 51 to pivot back and forth about pivot point 52. This produces a whipping motion in the free end of the leather thong 56 as it moves back and forth across the troughway 62 in such a manner that it rides up sloping wall 61 and onto an adjacent portion of the dial points 13. Thus, the thong 56 transfers lubricant from the troughway 62 onto the inward portions of the rotating dial points 13.

As can be seen in FIGURES 1 and 4, the leather thong 56 is located subsequent to the doffing device 30 with respect to the direction of rotation of the dial points, and lubricant transferred to the inward portions of the dial points by thong 56 is distributed outwardly along the points by the outward strokes of bristles 33a of the brush means 30. It can thus be seen that the pliable element and brush means cooperate to lubricate the dial points 13.

As seen from the foregoing disclosure, by incorporating the unique features of the present cutter, doffer and lubricating attachment in a standard looping machine as described, the machine can be operated to effectively cut and doff toe-seamed hosiery of light and heavy deniers, and to lubricate the dial points of the machine simultaneously.

As can be seen from the foregoing disclosure and description of the unique cutter and doffing mechanism, and the lubricating attachment therefor, a single drive shaft is effectively used to supply power to all of the component parts of the device. By means of eccentrically mounted crank arm 15, pivotally attached elongate arm 31, and lever 51, rotation in shaft 13 is transmitted to reciprocate the dozer brushes, the chain cutter, and the pliable element 56. By fixing the upper end of lever 51, motion transmitted to the lever is transformed into the desired whipping motion in the thong attachment thereto necessary to lubricate the dial points.

In the drawings and specifications there has been set forth a preferred embodiment of the invention and, although specific terms are employed, they are used in a generic and descriptive sense only and not for purposes of limitation, the scope of the invention being defined in the claims.

I claim:
1. In a hosiery looper machine having a rotary circular series of radially extending dial points movable about a substantially vertical axis and also having a sewing mechanism for forming a seam from a seaming thread looped through and over complementary loops of a hose impaled on the dial points, the combination of doffing brush means having bristles disposed adjacent and above the level of said dial points and located subsequent to said sewing mechanism with respect to the direction of rotation of said dial points, means imparting radially outward active and radially inward inactive strokes to said brush means in a reciprocatory manner substantially parallel to the radially projecting dial points, and means operatively associated with said stroke imparting means for moving at least some of said bristles downwardly between adjacent dial points during each active stroke to remove said impaled hose therefrom and for withdrawing said bristles from between said dial points during each inactive stroke.

2. Apparatus as defined in claim 1 in which said brush means comprises a pair of brush parts disposed substantially side by side along the series of dial points, one of said brush parts being positioned radially inwardly of the other of said parts and precedent thereto with respect to said direction of rotation, so that, during each active stroke, bristles of said one of said brush parts make initial contact with said hose to move a portion of it radially outwardly on said points and bristles of the other brush part thereafter contact and move said portion of hose off said points.

3. Apparatus as defined in claim 1 in which said looper machine includes an annular troughway located radially inwardly of said dial points and adapted to contain a liquid lubricant, and means operatively associated with said stroke imparting means for transferring liquid lubricant from said troughway onto said dial points.

4. Apparatus as defined in claim 3 in which said means operatively associated with said stroke imparting means includes an elongate pliable element located adjacent said dial points and having an end portion movable in said troughway and over adjacent portions of said dial points.

5. Apparatus as defined in claim 1 in which said looper machine includes an annular troughway located radially inwardly of said dial points and adapted to contain a liquid lubricant, an elongate pliable element located adjacent said dial points precedent to said brush means with respect to said direction of rotation and having an end portion movable in said troughway and over adjacent portions of said dial points, and means operatively connecting said pliable element to said stroke imparting means and imparting reciprocatory motion to said pliable element for transferring lubricant from said troughway onto adjacent portions of said dial points.

6. Apparatus as defined in claim 5 including thread cutting means located above said dial points between said brush means and said pliable element, said cutting means comprising a reciprocable cutting blade substantially vertically disposed above said dial points, a kicker element spaced closely adjacent and precedent to said cutting blade, means supporting said cutting blade and said kicker element and being operatively connected to said stroke imparting means for reciprocating said blade and kicker element above and longitudinally with respect to said dial points, said kicker element including a radially inward edge, a bottom edge projecting slightly below said cutting blade and in close proximity to the top of said dial points for impressing the loops of the hose impaled thereon, and said kicker element also including a hook adjacent said bottom edge extending from said inward edge toward said reciprocable cutting blade whereby said hook engages raised chain portions of thread for inward movement with said blade and kicker element, ramp means located adjacent a radially inner portion of said dial points and cooperating with said hook to guide raised chain portions of thread thereon, and a fixed cutting blade adjacent said ramp means and cooperating with said reciprocable cutting blade to sever the raised portions of thread guided by said ramp means and said hook.

7. Apparatus as defined in claim 1 including an annular troughway adapted to contain a liquid lubricant and located radially inwardly of said dial points, an elongate pliable element located above said dial points adjacent and precedent to said brush means with respect to said direction of rotation and having an end portion movable in said troughway and over adjacent portions of said dial points, and means operatively connecting said pliable element to said stroke imparting means and imparting reciprocatory movement to said pliable element in such manner that said element is operable to transfer lubricant from said troughway to said adjacent portions of the dial points, and at least a portion of the bristles of said brush means contacting said adjacent portions of the dial points during said active strokes to distribute lubricant thus transferred along said dial points.

8. Apparatus as defined in claim 1 in which the looper machine includes an annular troughway adapted to contain liquid lubricant and being located radially inwardly of said dial points, an elongate pliable element located above said dial points, means operatively connecting said pliable element to said stroke imparting means and imparting substantially horizontal reciprocatory movement to said pliable element, an end portion of said pliable element contacting inner surfaces of said troughway, and said connecting means including motion amplifying means for converting the substantially horizontal movement of said pliable element to a whipping motion in said end portion whereby lubricant in said troughway is transferred by said end portion to adjacent portions of said dial points.

9. Apparatus as defined in claim 1 including thread cutting means for severing a thread chain extending between adjacent hose on said dial points, said cutting means being located above said dial points and precedent to said brush means with respect to said direction of rotation, and comprising a reciprocable cutting blade substantially vertically disposed above said dial points, a kicker element spaced closely adjacent and precedent to said cutting blade with respect to said direction of rotation, means operatively connecting said cutting blade and said kicker element to said stroking imparting means for reciprocation above and longitudinally with respect to said dial points, said kicker element including a radially inward edge and a bottom edge projecting slightly below said cutting blade and in close proximity to the top of said dial points for impressing the loops of hose impaled thereon during reciprocation, and said kicker element also including a hook adjacent said bottom edge and extending from said inward edge in the direction of said reciprocable cutting blade whereby said hook engages raised portions of thread chain during the inward reciprocation of said cutting blade.

10. In a hosiery looper machine having a rotary circular series of radially extending dial points movable about a substantially vertical axis and also having a sewing mechanism for forming a seam from a seaming thread looped through and over complementary loops of a hose impaled on said dial points and also for forming a thread chain between adjacent hose on the dial points, the combination therewith of cutting means for severing the thread chain between the adjacent hose, said cutting means comprising a reciprocable cutting blade substantially vertically disposed above the dial points, a kicker element spaced closely adjacent and precedent to said cutting blade with respect to the direction of rotation of said series of dial points, means supporting said cutting blade and said kicker element for reciprocation above and longitudinally with respect to said dial points, means operatively associated with said cutting blade and kicker element for reciprocating said cutting blade and kicker element, said kicker element including a radially inward edge, a bottom edge projecting slightly below said cutting blade and in close proximity to the top of said dial points for impressing the loops of hose impaled thereon, and a hook located above said bottom edge and extending from said inward edge toward said cutting blade whereby during inward movement of reciprocation said hook engages the thread chain between successive hose and positions it for being severed by the cutting blade.

References Cited

UNITED STATES PATENTS

| | | | |
|---|---|---|---|
| 999,463 | 8/1911 | Niedermayr | 112—26 |
| 1,603,777 | 10/1926 | Keyser | 112—26 |
| 2,191,288 | 2/1940 | Pons | 112—25 |
| 3,051,104 | 8/1962 | Graves | 112—25 |
| 3,081,722 | 3/1963 | Peloggio | 112—252 |

JORDAN FRANKLIN, *Primary Examiner.*

G. V. LARKIN, *Assistant Examiner.*

U.S. Cl. X.R.

112—252, 256